US007641210B2

(12) United States Patent
Babcock et al.

(10) Patent No.: US 7,641,210 B2
(45) Date of Patent: Jan. 5, 2010

(54) HAND-DRIVEN WHEELCHAIR

(76) Inventors: Martin Babcock, 2774 Rivera Dr. South, White Bear Lake, MN (US) 55110; George Knuteson, 10051 Kerry Ct. North, Hugo, MN (US) 55038

( * ) Notice: Subject to any disclaimer, the term of this patent is extended or adjusted under 35 U.S.C. 154(b) by 132 days.

(21) Appl. No.: 11/897,038

(22) Filed: Aug. 29, 2007

(65) Prior Publication Data

US 2009/0058035 A1 Mar. 5, 2009

(51) Int. Cl.
*B62M 1/14* (2006.01)

(52) U.S. Cl. ................. 280/250.1; 280/304.1; 280/247; 280/246; 280/248

(58) Field of Classification Search .............. 280/250.1, 280/304.1, 247, 246, 248
See application file for complete search history.

(56) References Cited

U.S. PATENT DOCUMENTS

| | | | |
|---|---|---|---|
| 413,104 | A | 10/1889 | Saxton |
| 504,685 | A | 9/1893 | Steel |
| 2,135,347 | A | 11/1938 | Lorbeski |
| 2,732,221 | A | 1/1956 | Welch |
| 4,641,847 | A | 2/1987 | Busse |
| 4,762,332 | A | 8/1988 | Seol |
| 4,858,483 | A | 8/1989 | Blakemore |
| 5,007,655 | A | 4/1991 | Hanna |
| 5,020,815 | A | 6/1991 | Harris et al. |
| D330,177 | S | 10/1992 | Shetter |
| 5,232,236 | A | 8/1993 | Korpi |
| 5,236,398 | A | 8/1993 | Barnett |
| 5,241,876 | A | 9/1993 | Mathis |
| 5,297,810 | A | 3/1994 | Lukyanov |
| 5,322,312 | A | 6/1994 | Cammack |
| 5,362,081 | A | 11/1994 | Beidler |
| 5,499,833 | A | 3/1996 | Her et al. |
| 5,509,673 | A | 4/1996 | Wu et al. |
| 5,577,412 | A | 11/1996 | Vasiliev |
| 5,743,544 | A | 4/1998 | Weaver |
| 5,846,154 | A | 12/1998 | Godin |
| 5,873,589 | A | 2/1999 | Hallett |
| 5,941,547 | A | 8/1999 | Drake |
| 6,196,565 | B1 | 3/2001 | Chubbuck |
| 6,257,607 | B1 * | 7/2001 | Franks .................... 280/242.1 |
| 6,325,398 | B1 | 12/2001 | Banzi |
| 6,408,961 | B1 | 6/2002 | Chen |
| 6,428,028 | B1 | 8/2002 | Folino et al. |

(Continued)

*Primary Examiner*—Lesley Morris
*Assistant Examiner*—Marlon A Arce
(74) *Attorney, Agent, or Firm*—D L Tschida

(57) ABSTRACT

A hand-operated assembly that supplies secondary drive power and steering control to a secondary drive wheel of a wheel chair. The assembly comprises a handle that is controlled with one hand and a linkage rod that extends from the handle to an eccentric arm fitted to a one-way clutch assembly at a secondary drive wheel support axle. Reciprocating up-down, pivoting movements of the handle over a range Y' in the Y axis directs a linkage rod to rotate an eccentric arm fitted to a one-way clutch and a drive axle of a small diameter, secondary drive wheel. Independent 360° rotation of the handle about a second, horizontal or Z axis steers the secondary drive wheel. A portion Y' of the range of handle motion directs a flange at the linkage arm to engage a brake piece that contacts the secondary drive wheel. Large diameter, hand driven, primary drive wheels are separately available to the user for effecting normal chair conveyance.

23 Claims, 5 Drawing Sheets

U.S. PATENT DOCUMENTS

| | | | | |
|---|---|---|---|---|
| 6,669,222 | B1 * | 12/2003 | Barrett et al. | 280/304.1 |
| 6,715,780 | B2 | 4/2004 | Schaeffer | |
| 6,746,034 | B2 | 6/2004 | Fowles | |
| 6,755,430 | B1 | 6/2004 | Watwood et al. | |
| 6,805,371 | B2 | 10/2004 | Meginniss et al. | |
| 6,820,885 | B1 | 11/2004 | Oshimo | |
| 6,916,032 | B2 | 7/2005 | Wong | |
| 7,077,415 | B2 * | 7/2006 | Ikeda et al. | 280/246 |
| 2002/0043781 | A1 | 4/2002 | Mitchell | |
| 2003/0000748 | A1 | 1/2003 | McHardy | |
| 2003/0089537 | A1 | 5/2003 | Sinclair et al. | |
| 2004/0104554 | A1 | 6/2004 | Watwood | |
| 2004/0108147 | A1 | 6/2004 | Ross | |
| 2005/0269797 | A1 | 12/2005 | Mitchell | |
| 2005/0275190 | A1 | 12/2005 | Pettit | |
| 2006/0131832 | A1 | 6/2006 | Lindsay | |
| 2006/0208452 | A1 | 9/2006 | Mittelstaedt | |
| 2006/0261571 | A1 | 11/2006 | Mitchell | |
| 2007/0108721 | A1 | 5/2007 | Bayne et al. | |

* cited by examiner

HAND-DRIVEN WHEELCHAIR

BACKGROUND OF THE INVENTION

The present invention relates to wheelchairs and, in particular, to a wheelchair having a drive and steering linkage whereby a wheelchair bound user with a single hand and small hand movement can drive a small diameter idler wheel, independent of large diameter hand drive wheels, to rotate the idler wheel and steer the chair.

A wide variety of wheelchairs exist for conveying geriatric and non-ambulatory individuals. Most chairs provide for a pair of relatively large diameter wheels that contain concentric hand rails. The rails can be grasped, rotated and/or manipulated by the user to drive and direct the chair. Most chairs also provide a pair of smaller diameter idler or non-driven wheels that typically support the front end of the chair. The idler wheels stabilize the chair and distribute the weight of the user. The idler wheels are mounted to rotate in associated support columns and follow motions directed by the larger diameter drive wheels A variety of after-market and integrated assemblies have also been developed to provide drive power to the drive wheels of a wheel chair. Many assemblies actively drive the chair with the aid of a battery power source and associated drive linkage.

Many ratchet and lever arm accessories also exist in the art that apply drive power to the large diameter drive wheels without having to grip the hand rings. For example, U.S. Pat. No. 5,232,236 and published applications 2002/0043781; 2005/0269797; 2005/0275190; and 2006/0261571 disclose some of these assemblies. Some assemblies provide for foot and hand crank operation. U.S. Pat. Nos. 5,297,810; 5,873,589; 6,196,565;

A variety of hand manipulated lever arm assemblies have also been developed for wheel chairs that include drive linkages that cooperate with the large diameter wheel drive axles. To and fro movement of one or more included lever arms mounted to pivot at the chair direct associated linkages (e.g. chain, belt and rod) coupled to supporting axles to drive the large diameter wheels. Some of these assemblies can be found at U.S. Pat. Nos. 4,641,847; 4,762,332; 5,007,655; 5,020,815; 5,236,398; 5,322,312; 5,499,833; 6,325,398; 6,715,7890; 6,746,034; and 6,820,885. An arm rest that pivots side to side and cooperates with an eccentric coupled link rod is disclosed at U.S. Pat. No. 5,509,673.

A hand crank assembly that rotates about one axis to supply drive power to a depending chain and independently rotates about a second axis to provide steering to a large diameter drive wheel is shown at US published application 2006/0131832. A pivoting lever arm assembly and chain linkage that cooperates with a large diameter drive wheel and separately provides a rotating steering hand hold that cooperates with a small diameter idler wheel is shown at U.S. Pat. No. 6,916,032.

In contrast to the foregoing, the present invention provides a multi-axial hand-operated lever arm that pivots with limited hand movement in one axis (i.e. Y axis) to couple drive power via a rigid drive arm to a one-way clutch and small diameter drive wheel. Reciprocating vertical movement of the hand arm particularly supplies drive power to an eccentric arm fitted to the one-way clutch and a drive axle of a small diameter, secondary drive wheel. The hand arm independently rotates 360° about a horizontal or Z axis within a support column to steer the associated secondary drive wheel. Large diameter, primary drive wheels with hand rings are separately available to the user for normal conveyance.

SUMMARY OF THE INVENTION

It is a primary object of the invention to provide a hand-operated assembly to supply drive power and steer a drive wheel of a wheelchair.

It is further object of the invention to provide a hand-operated, multi-axis linkage operated by a single hand with limited movement to supply drive power and steer a secondary drive wheel of a wheelchair.

It is further object of the invention to provide a hand-operated lever arm that pivots in the Y axis at a support column fitted to a wheel chair and manipulates a drive rod coupled to an eccentric arm fitted to a one-way clutch at a drive axle and supported drive wheel.

It is further object of the invention to provide a pivoting hand arm that independently rotates 360° at a support column in the Z axis to steer a drive wheel driven by a drive rod and eccentric arm fitted to a one-way clutch at a drive axle.

It is further object of the invention to provide a modular support column having drive and steering linkages that couple to an idler support wheel of a wheel chair.

It is further object of the invention to provide a modular accessory drive and steering assembly for a secondary drive wheel of a wheelchair.

It is further object of the invention to provide a drive and steering assembly that cooperates with an associated brake for a secondary drive wheel of a wheelchair.

The foregoing objects, advantages and distinctions of the invention are obtained in a presently preferred assembly shown at attached figures. The assembly permits a wheelchair bound individual to selectively apply drive power with a single hand via a column mounted, pivoting lever arm or handle to a secondary drive wheel secured to the column. A linkage rod is directed from the lever arm to an eccentric arm fitted to a one-way clutch assembly secured to a wheel support axle at the secondary drive wheel. Limited, pivoting motions at the handle rotate and drive the axle and secondary drive wheel.

Steering is obtained upon rotating the lever arm and linkage rod within the column and thereby the drive wheel. That is, the lever arm is independently mounted to rotate 360° within the column about the Z axis to turn and steer the secondary drive wheel. Relatively short strokes of the handle lever arm in the Y axis over a range of motion Y' are translated into controlled movements of the secondary drive wheel. A longer stroke motion of the lever arm over a range of motion Y" induces a flange at the linkage rod to engage a brake pad mounted to pivot at the column and engage the secondary drive wheel.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. Rather, the invention should be interpreted within the broad scope of the further appended claims.

BRIEF DESCRIPTION OF THE DRAWINGS

Several figures and photographs are provided which disclose presently preferred constructions of the invention and comprise the following.

DESCRIPTION OF THE PREFERRED EMBODIMENT

Figure 1:
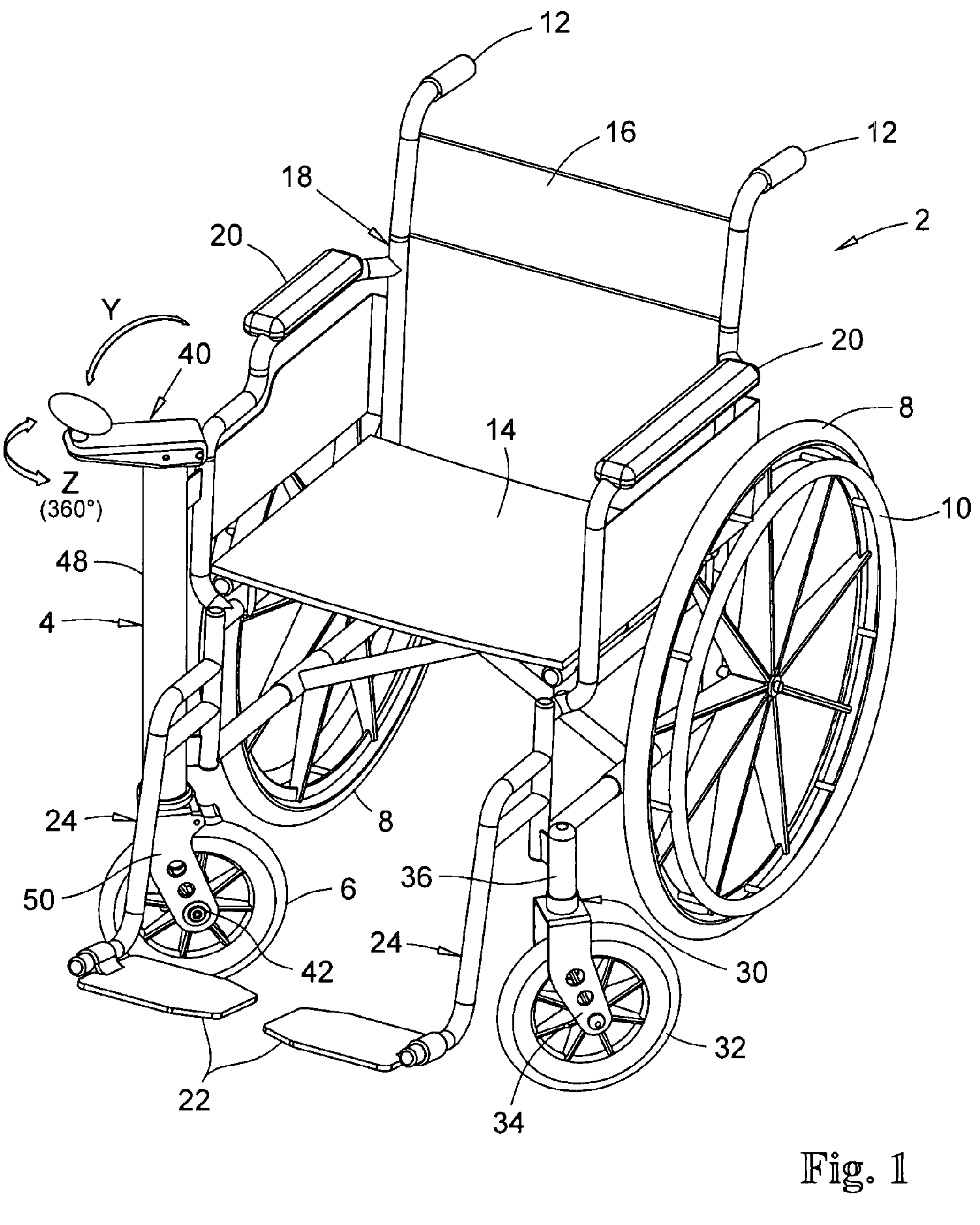
FIG. 1 is a perspective drawing of a wheel chair fitted with the hand operated lever arm and associated secondary drive wheel assembly of the invention.

Referring to FIGS. 1, a perspective view is shown to a wheelchair assembly 2 of the invention. The wheelchair 2 is generally constructed in conventional fashion but is fitted with a novel, hand-operated drive/steering assembly 4 that cooperates with a secondary drive wheel 6. The assembly 4 is operable with limited movements from a single hand and is described in greater detail below with additional attention to FIGS. 2 through 6.

Depending upon the manufacturer and chair application, the chair 2 can be constructed to a variety of forms and with a variety of wheel configurations. The depicted chair 2 however is representative of the most typical chair design used by hospitals, nursing homes etc. It is to be appreciated therefore that the assembly 4 can be adapted to a variety of chair constructions with differing seat, back rest and primary drive wheel configurations.

The chair 2 provides right and left primary drive wheels 8 or relatively large diameter (e.g. 24 to 36 inches). Hand rings 10 are fitted to the drive wheels 8 to provide a mechanism for a physically able occupant to control movements of the wheels 8 to direct the chair 2. Handles 12 are provided for an attendant to push and manipulate the chair 2. A hammock or sling-type seat 14 and backrest 16 are stretched between frame members of a support framework 18. Pairs of armrests 20 and footrests 22 are fitted to the framework 18. The footrests 22 and/or support arms 24 can be constructed to pivot to facilitate ingress and egress from the chair or may be deleted such as with sport type chairs.

Fitted to the forward end of the framework 18 is a typical idler wheel assembly 30. The assembly 30 provides a secondary, chair support wheel 32 (e.g. 5-8 inches in diameter) that depends from a yoke 34. The yoke 34 is supported to rotate on bearing surfaces fitted to a column piece 36. Most wheelchairs include two idler wheel assemblies 30 that are permanently constructed with the chair to distribute the load of the occupant and stabilize the front of the chair 2 during a user's ingress and egress. The idler wheels passively follow motion directed by the primary drive wheels 8.

The wheel chair 2 has been improved to include at least one hand-operated drive/steering assembly 4 and secondary drive wheel 6 in combination with an idler wheel assembly 30. The secondary drive wheel 6 of the assembly 4 is of a comparable size to the idler wheel 32. The assembly 4 enables a user having some hand strength in at least one hand to manipulate and steer the chair 2, even if unable to direct the primary drive wheels 8.

The idler wheel 32 and drive wheels 8 follow motions directed by the secondary drive wheel 6 and hand operations performed at a hand controlled, handle or lever arm 40. The assembly 4 finds particular application for geriatric and infirmed individuals, who can now manipulate the chair 2 within activity spaces that don't require long distance movement (e.g. eating areas, social areas, reading areas or outdoor rest areas) without requiring an attendant. The assembly 4 can be fitted to a chair 2 with appropriate fasteners as an after-market improvement.

Figure 2:
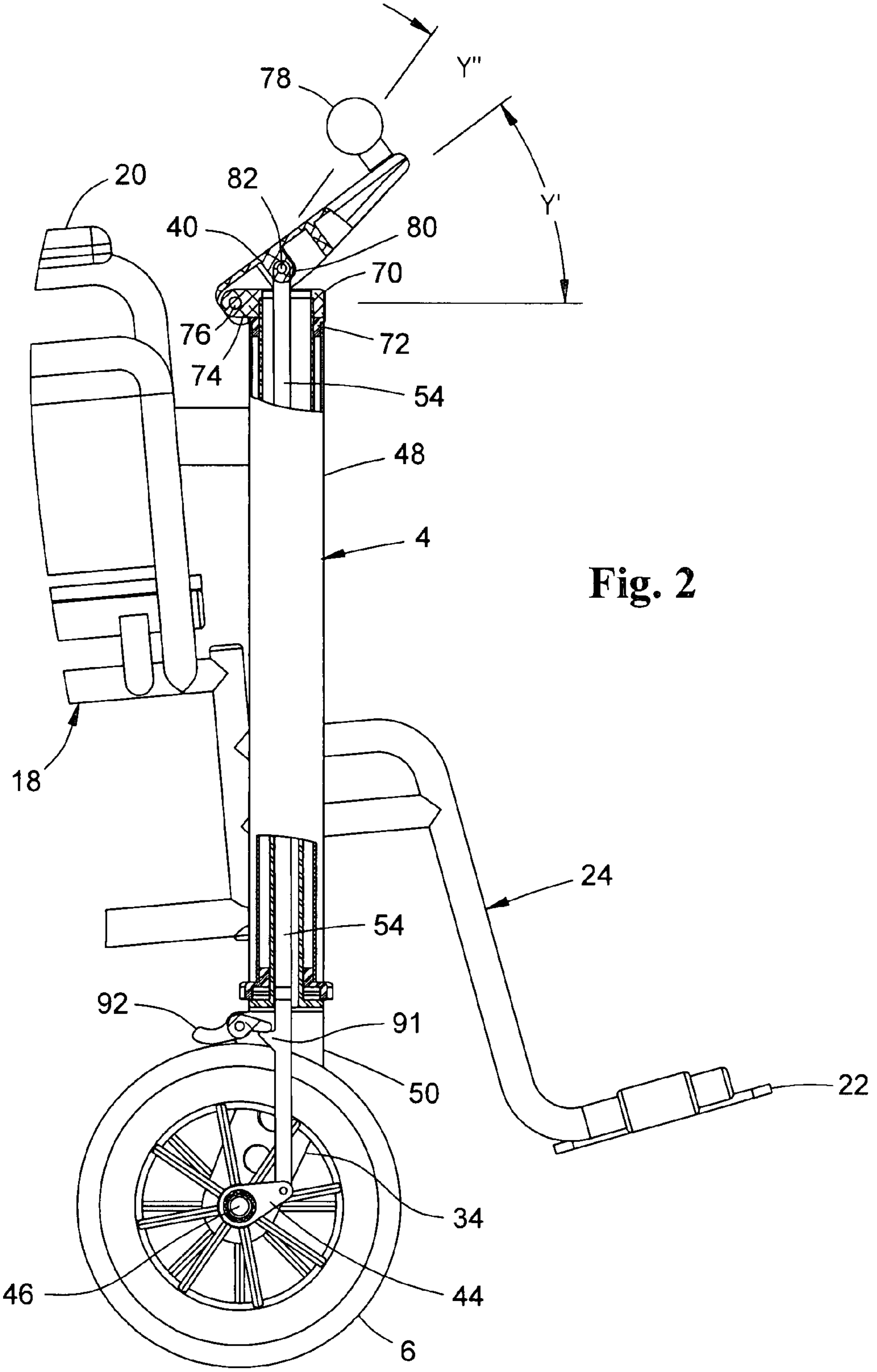
FIG. 2 is a partial cutaway view to the lever arm, support column and drive linkage.
Figure 3:
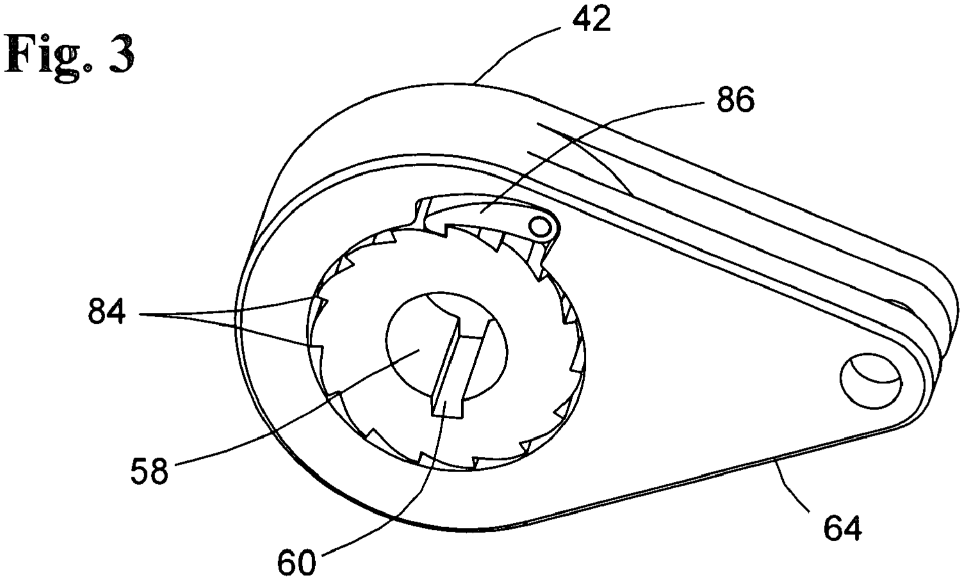
FIG. 3 is a perspective drawing showing a keyed, ratchet and pawl one-way clutch assembly that mounts to a driven axle.
Figure 4:
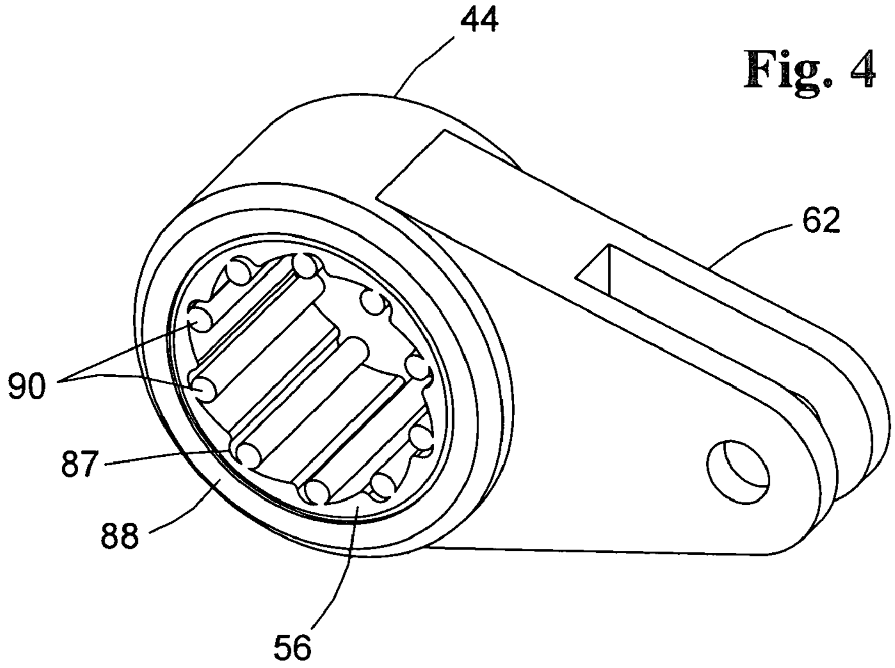
FIG. 4 is a perspective drawing showing a roller, one-way clutch bearing assembly that mounts to a driven axle.
Figure 5:
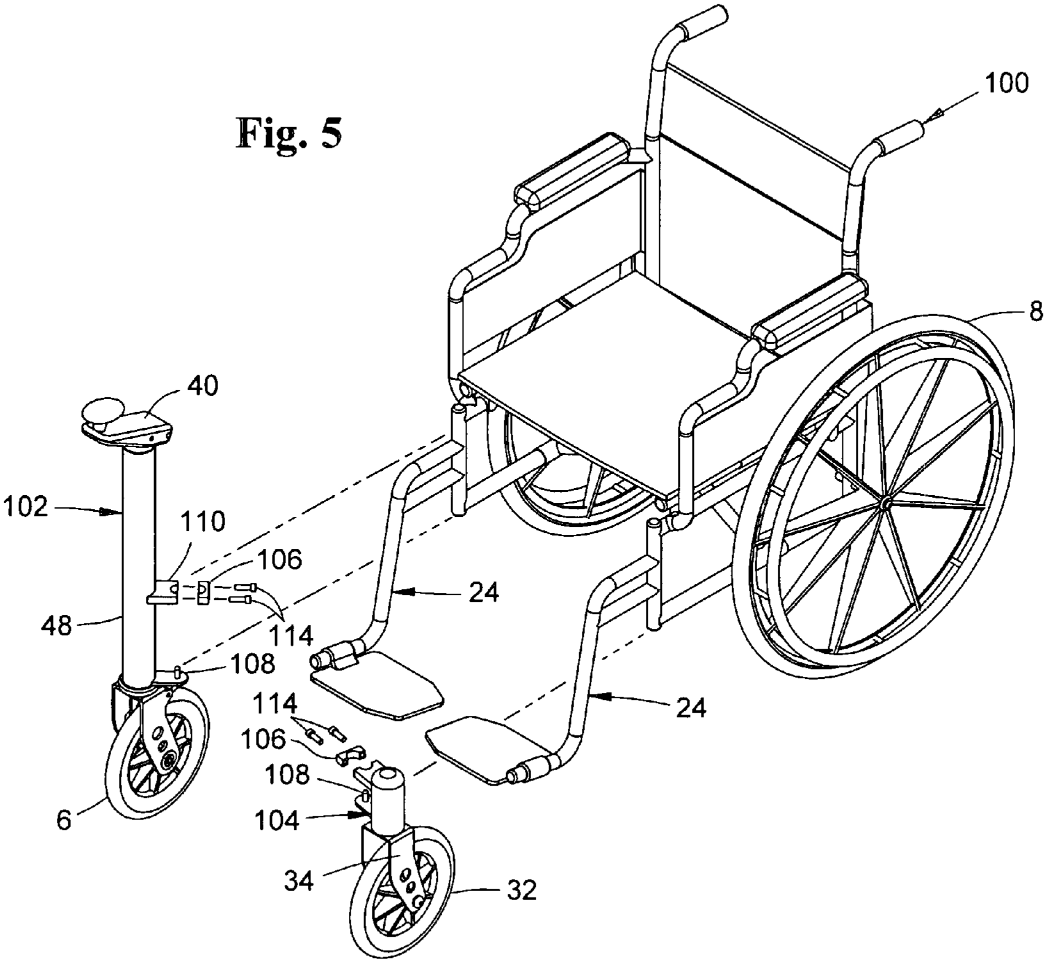
FIG. 5 is a perspective drawing showing a wheel chair with a detachable idler wheel and a drive/steering assembly and associated secondary drive wheel.
Figure 6:
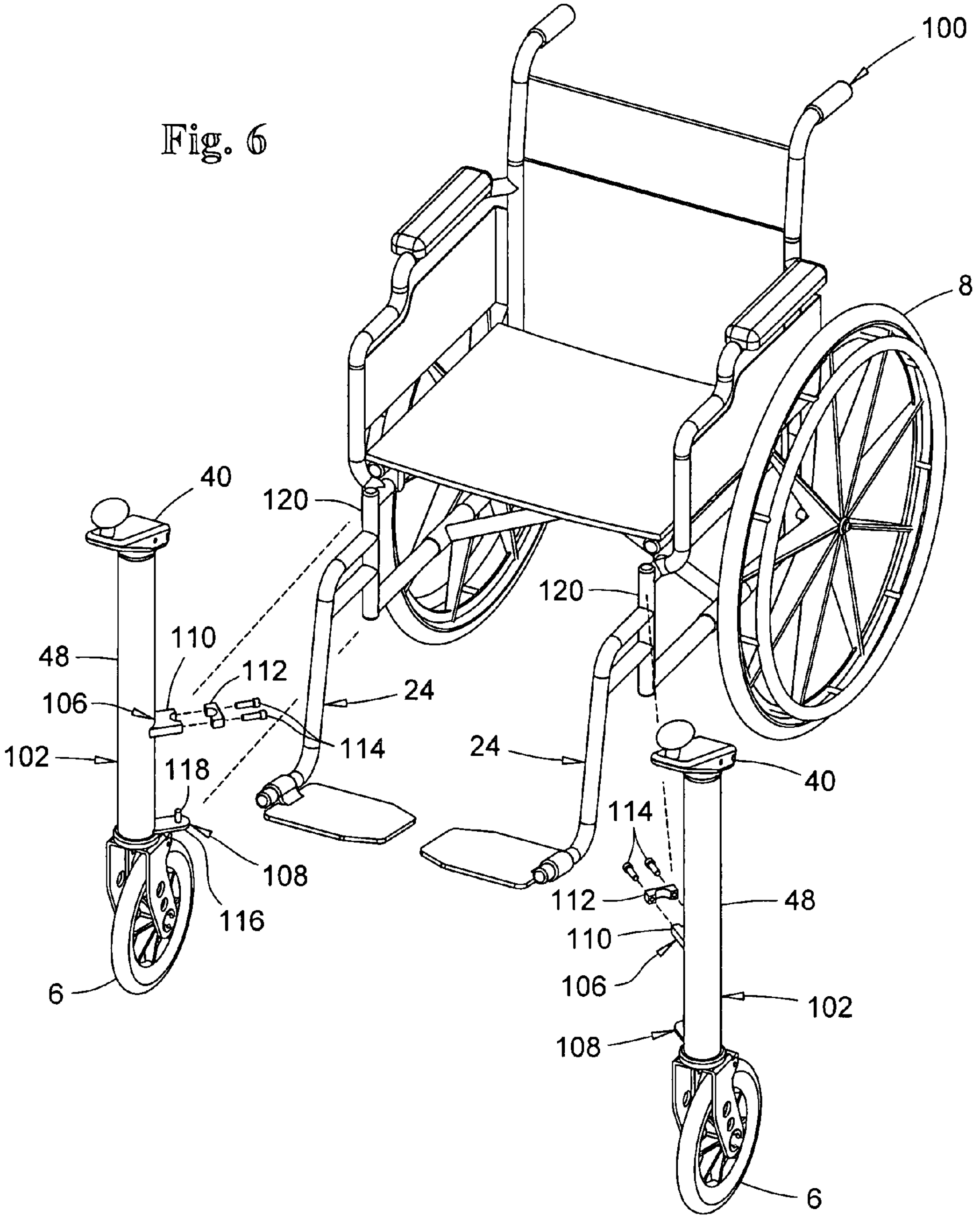
FIG. 6 is a perspective drawing showing a wheel chair with a pair of detachable drive/steering assemblies and associated secondary drive wheels.

Turning attention to FIGS. 2 through 4, FIG. 2 depicts a perspective view of the drive/steering assembly 4 in partial cutaway. FIGS. 3 and 4 depict alternative constructions of one way, over-running clutch assemblies 42 and 44 that can be secured to a driven axle 46 supporting the secondary drive wheel 6 and coupled to the lever arm 40. The assembly 4 can be permanently mounted to the chair 2 such as by welding. Alternatively, FIGS. 5 and 6 depict modular after-market assemblies 4 that can be fastened to a chair to obtain the benefits of the invention and enhance the utility of a chair 2. Depending upon the chair 2, minor modifications may have to be performed to adapt the drive/steering assembly 4.

The assembly 4 generally comprises the handle or lever arm 40 which is mounted to rotate about a support column 48 that is coupled to a yoke 50 that supports the driven axle 46 and the secondary drive wheel 6. A rigid linkage rod 54 extends between the lever arm 40 and a one-way, over-running clutch 44 that is keyed or coupled to the driven axle 46, reference FIG. 4. Either of the clutch assemblies 42 or 44 of FIGS. 3 and 4 can be adapted to the assembly 4.

The clutch assembly 42 is secured to the axle 46 with a key (not shown) at mating keyways 60 let into the clutch 42. The inner roller bearing portion 56 of clutch assembly 44 is press fit onto the axle 46. A variety of alternative clutch assemblies and fastenings can be used to facilitate the coupling of the handle 40 and linkage rod 54 to the axle 46 and/or wheel 6.

The linkage rod 54 is fastened to an offset end of a lobe or eccentric 62 or 64 that project from the clutch assemblies 44 and 42. The radial offset of the fastening point of the linkage rod 54 to the lobes 62 and 64 from the axle 46 serves as an eccentric or lever arm which defines the effective stroke length of the lever arm 40. Presently, the lobes 62 and 64 projects approximately 1 to 2 inches and which translates to a range of travel distance at the secondary drive wheel 6 of approximately 2 to 4 inches over the equivalent range of motion Y' at the lever arm 40. The actual range of chair movement can be varied as desired by varying the fulcrum or pivot point 82 of the lever arm 40 and/or the length of the lobes 62 and 64 and displacement of the linkage rod 54 from the axle 46 or with other associated gearing etc.

Returning attention to the lever arm 40, the arm 40 is secured to a head piece 70 mounted to the column 48. The head piece 70 is supported on a bearing 72 and the lever arm 40 thus can be rotated 360° about the Z axis. The lever arm 40 mounts to the head piece 70 at a pivot yoke 74 at a pivot pin 76. The lever arm 40 extends approximately 5 to 6 inches and includes a rotating hand knob 78 to facilitate reciprocating vertical and rotational horizontal movements of the lever arm 40.

The linkage rod 54 is secured to a pivot bracket 80 formed with and that depends from an inner surface of the arm 40 and a pivot pin 82 that defines the fulcrum point of the lever arm 40. Over the range of arm motion Y', the rod 54 rises and falls within the column 48 to rotate an associated lobe 62 or 64 and associated outer clutch assembly 44 or 42 to advance the axle 46 in a preferred clockwise or counterclockwise direction. Counter rotation of the axle 46 is prevented such as by the cogs 84 and pawl 86 at the clutch assembly 42. Roller bearings 85 that move along arcuate, ramped or tapered surfaces at depressions 87 of the clutch assembly 44 grip and release the axle 46 and similarly limit movement of the axle 46 to be unidirectional.

With the operation of the hand lever 40 within the range of motion Y', the secondary drive wheel 6 incrementally moves the chair 2 as desired by the occupant. Upon elevating the arm 40 into the Y" range of motion, a flange 91 that projects from the linkage rod 54 engages and rotates a brake member 92 into engagement with the secondary drive wheel 6. Upon engaging the wheel 6, a frictional surface of the brake member 92 slows rotation of the wheel 6. The brake member 92 is normally biased to prevent physical contact with the wheel 6. A retainer mechanism may be included that cooperates with the latch arm 4 to secure the arm 40 in an elevated condition within the Y" range of motion to lock movement of the chair 2, once situated by the occupant. The mounting location of the lever arm 40 may also be re-located as desired with or without modification of the linkage rod 54.

Although the drive/steering assembly 4 is shown as being permanently mounted to the chair 2, FIGS. 5 and 6 depict alternative arrangements wherein representative wheel chairs 100 are shown without any idler support wheels 32. Combinations of one or two modular drive/steering assemblies 102 and/or a modular idler wheel assembly 104 are shown that can be coupled to improve the support of the chairs 102. The depicted chairs exemplify the modularity of the drive/steering assemblies 4 and 102 to improve the functionality of a wheelchair during initial construction or as an after-market modification and improvement.

The drive/steering assembly 102 and idler assemblies 104 are substantially identical to the assemblies 4 and 30 with the exception of including representative, detachable fasteners 106 and 108. The fasteners 106 provide mating clamp collars 110 and 112 that cooperate with threaded fasteners 114. The collars 110 and 112 detachably secure the assembly 102 to an upper end of a frame piece 120 at the chair 100.

The fasteners 108 provide an extension plate 116 and an upright pin 118. The pin 118 mounts to a lower end of the frame piece 120. Collectively the fasteners 106 and 108 effectively secure the assemblies 102 and 104 to the wheel chairs 100 yet permit adjustments to facilitate proper alignment. Other types of interconnected, detachable fasteners 106 and 108 can be adapted to obtain a desired retention of the drive/steering assemblies 102 and idler assembly 104 to a chair.

The chair 100 at FIG. 5 when fitted with the assemblies 102 and 104 as an after-market modification is essentially identical to the chair 2. The chair 100 of FIG. 6 in contrast includes a pair of independently mounted drive/steering assemblies 102. The operator necessarily must coordinate and synchronize steering and drive hand movements to assure a desired travel. By operating the arms 40 in an alternating treadle fashion, the range of chair movement however is expanded.

While the invention is shown and described with respect to a presently preferred wheelchair drive/steering assembly and several considered improvements, modifications and/or alternatives thereto, still other assemblies and arrangements may be suggested to those skilled in the art. It is also to be appreciated that the singular features of the drive/steering assembly of the invention can be arranged in different combinations and adapted to different chairs. For example, the drive steering assembly can be modified to provide for movement of the handle 40 along only one axis and combined with a chair to selectively steer or drive the wheel 6. The foregoing description should therefore be construed to include all those embodiments within the spirit and scope of the following claims.

What is claimed is:

1. A wheelchair comprising:

a) a framework including a seat and first and second primary drive wheels mounted to said framework and each accessible to a seated user for rotation by hand to move said wheel chair; and b) a secondary drive assembly comprising 1) a third wheel, 2) a handle, 3) a multi-axis coupler mounted to said framework, wherein said handle is coupled to said multi-axis coupler to pivot to and fro about a first axis of said coupler and rotate about a second axis of said coupler, and 4) a rigid linkage coupled to said handle and extending to a clutch linkage coupled to said third wheel, wherein said handle is responsive to reciprocating, pivoting hand movements along said first axis to direct said rigid linkage to rotate and drive said third wheel and said framework over a support surface, and wherein said handle is independently responsive to rotational hand movements about said second axis to direct said rigid linkage to rotate said third wheel about said second axis to steer said third wheel and framework independent of said first and second wheels.

2. A wheel chair as set forth in claim 1 wherein the first axis of movement of said coupler is defined by a pivot pin and said second axis of movement is defined by a circular bearing surface.

3. A wheelchair assembly as set forth in claim 1 wherein said secondary drive assembly includes a rigid linkage arm and a one-way clutch mounted to an axle supporting said third wheel, wherein said handle is mounted to said linkage arm to rotate 360° at said coupler and such that rotation of said handle rotates said third wheel about said second axis to steer said framework with 360° freedom of movement.

4. A wheelchair assembly as set forth in claim 3 wherein said rigid linkage arm is mounted in a bore of a tubular member secured to said framework that supports said coupler.

5. A wheelchair assembly as set forth in claim 1 wherein said first and second wheels exhibit a first diameter and said third wheel exhibits a second diameter and wherein said second diameter is substantially smaller than said first diameter.

6. A wheelchair assembly as set forth in claim 1 wherein said handle is mounted to rotate 360° at said coupler about said second axis.

7. A wheelchair assembly as set forth in claim 1 including a fourth wheel to exhibiting said second diameter and mounted to said framework to follow movements directed by said first, second and third wheels.

8. A wheelchair assembly as set forth in claim 3 wherein said one-way clutch comprises a plurality of roller bearings independently mounted to traverse a plurality of depressed cavities having tapered surfaces relative to said axle to selectively grip and release said axle depending upon the rotational direction of said third wheel.

9. A wheelchair assembly as set forth in claim 1 wherein said secondary drive assembly includes a rigid linkage arm coupled to said handle and to a one-way overrunning clutch assembly mounted to an axle supporting said third wheel and wherein said coupler rotates 360° about said second axis such that said handle can steer said third wheel and framework with 360° freedom of movement.

10. A wheelchair assembly as set forth in claim 1 including a brake member mounted to engage said third wheel, wherein movement of said handle at said first axis provides for first and second ranges of motion, wherein handle movement within the first range rotates and drives said third wheel and handle movement within the second range operates said brake to engage said third wheel.

11. A wheelchair assembly as set forth in claim 1 wherein said secondary drive assembly includes a brake member mounted to contact said third wheel, wherein said rigid linkage comprises a rigid linkage arm having a surface coupled to said brake member and to an overrunning clutch coupled to an axle supporting said third wheel and wherein the surface of the linkage arm over a portion of a range of reciprocating movement of the handle responsively engages the brake member to engage the third wheel.

12. A wheelchair assembly as set forth in claim 1 including a detachable coupler for fastening said secondary drive assembly to said framework.

13. A method for selectively directing movement of a wheelchair comprising:

a) selectively rotating first and second primary drive wheels of a framework including a plurality of frame members that define a seat and wherein each of said first and second wheels is accessible to a seated user for rotation by hand to primarily direct said wheel chair over a support surface; and b) independently operating a secondary drive assembly mounted to said framework and including a handle mounted to pivot about a first axis and rotate 360° about a second axis, a linkage arm coupled to said handle and to a one-way clutch assembly mounted to a third wheel, wherein reciprocating pivotal movement of said handle about said first axis provides drive power to rotate said third wheel over said support surface to move said wheel chair, and wherein rotational movement of said handle over a range of 360° about said second axis steers said third wheel and said wheel chair with 360° freedom of movement over said support surface, whereby movement of said wheelchair can be selectively directed with hand rotation of said first and second wheels or operation of said handle.

14. A method as set forth in claim 13 wherein said wheelchair includes a brake member mounted to engage said third wheel and including the step of manipulating said handle to engage said brake member and restrict rotation of said third wheel.

15. A method as set forth in claim 14 wherein said linkage arm includes a flanged surface that engages said brake member over a portion of the range of pivoting movement of said handle.

16. A method as set forth in claim 13 wherein said first and second wheels exhibit a first diameter and said third wheel exhibits a second diameter and wherein said second diameter is substantially smaller than said first diameter, and wherein said wheelchair includes a fourth wheel exhibiting said second diameter and mounted to said framework to follow movements directed by said first, second and third wheels.

17. A method as set forth in claim 13 wherein reciprocating up/down movement of said handle rotates said third wheel over said support surface, and wherein horizontal rotation of said handle rotates said third wheel to steer said wheel chair with 360° freedom of movement.

18. A wheelchair comprising:

a) a framework including a plurality of frame members and a seat and first and second primary drive wheels mounted to said framework and each accessible to a seated user for rotation by hand to move said wheel chair; and b) a secondary drive assembly mounted to said framework having a third wheel, a handle mounted to pivot from the upper end of a vertical member, a clutch linkage coupling said handle to said third wheel and a brake member to engage said third wheel, wherein said handle is responsive to reciprocating, pivoting hand movements over first and second ranges of motion, wherein movement of said handle within the first range of motion independently rotates and drives said third wheel and wheel chair over a support surface, and wherein movement of said handle within the second range of motion responsively operates said brake member to engage said third wheel, and wherein said handle is independently responsive to rotational hand movements about a second axis to rotate and steer said third wheel and wheel chair independent of said first and second wheels.

19. A wheelchair comprising:

a) a framework including a plurality of frame members, a seat, a backrest, and first and second primary drive wheels exhibiting a first diameter mounted to said framework and each accessible to a seated user for rotation by hand to move said wheel chair, and a third idler wheel mounted to said framework exhibiting a second diameter smaller than said first diameter; and b) a secondary drive assembly mounted to said framework comprising 1) a rigid linkage arm mounted to extend in a bore of a tubular member and coupled to an overrunning clutch coupled to an axle supporting said third wheel, a 2) handle coupled to said tubular member and to said rigid linkage arm to pivot relative to said tubular member with reciprocating hand movements to rotate said third wheel and to independently rotate said linkage arm and third wheel 360° with rotating hand movements, wherein said reciprocating, pivoting hand movements of said handle direct said linkage arm and clutch to rotate said third wheel to drive the third wheel over a support surface, and wherein rotating hand movement of said handle steers the wheel chair with 360° freedom of movement over the support surface, and 3) a brake member mounted to contact said third wheel and wherein said linkage arm includes a flange surface mounted to engage said brake member over a portion of the range of the pivoting motion of said handle to responsively engage the third wheel.

20. A method for selectively directing movement of a wheelchair comprising:

a) selectively rotating first and second primary drive wheels of a framework including a plurality of frame members and a seat and wherein each of said first and second wheels is accessible to a seated user for rotation by hand to primarily direct said wheel chair over a support surface; and b) independently operating a secondary drive assembly mounted to said framework and including a handle, a linkage arm coupled to said handle and to a one-way clutch assembly mounted to a third wheel, wherein reciprocating pivotal movement of said handle along a first axis provides drive power to rotate said third wheel over said support surface to move said wheel chair, and wherein rotational movement of said handle along a second axis steers said third wheel and said wheel chair with 360° freedom of movement over said support surface; and c) wherein said wheelchair includes a brake member mounted to engage said third wheel, wherein said linkage arm includes a flanged surface that engages said brake member over a portion of the range of pivoting movement of said handle and including the step of manipulating said handle to responsively direct said brake member to engage the third wheel and and restrict rotation of said third wheel along said support surface, whereby movement of said wheelchair can be selectively directed with hand rotation of said first and second wheels or operation of said handle.

21. A wheelchair comprising:

a) a framework including a seat and first and second primary drive wheels mounted to said framework and each accessible to a seated user for rotation by hand to move said framework; and b) a secondary drive assembly comprising 1) a third wheel, 2) a handle, 3) a coupler having multiple axes of movement, and 4) a tubular member mounted to said framework and having a bore, wherein said coupler is fitted to said tubular member and said handle is fitted to said coupler to pivot to and fro about a first axis of movement and rotate 360° about a second axis of movement, and 5) a rigid linkage arm coupled to said handle and extending through said bore to a clutch linkage coupled to said third wheel, wherein said handle is responsive to reciprocating hand movements about said first axis to provide drive power to rotate and drive said third wheel and said framework over a support surface, and wherein said handle is independently responsive to rotational hand movements about said second axis to rotate said third wheel about said second axis to steer said third wheel and framework independent of said first and second wheels with 360° freedom of movement.

22. A wheelchair assembly as set forth in claim 21 wherein said secondary drive assembly includes a brake member and wherein said rigid linkage arm includes a surface that engages said brake member to responsively engage said third wheel and restrict rotation.

23. A wheelchair assembly as set forth in claim 21 wherein said secondary drive assembly includes a brake member mounted to contact said third wheel and wherein said linkage arm includes a flange surface mounted to engage said brake member to responsively engage and restrict rotation of said third wheel over a portion of the range of reciprocating movement of the handle along the first axis.

* * * * *